Aug. 5, 1924.

P. M. HALL

PROCESS OF WELDING CAST IRON TO STEEL

Filed Jan. 20, 1922

1,503,827

INVENTOR
Preston M. Hall
BY
Townsend & Weeker
ATTORNEYS.

Patented Aug. 5, 1924.

1,503,827

UNITED STATES PATENT OFFICE.

PRESTON M. HALL, OF SWAMPSCOTT, MASSACHUSETTS, ASSIGNOR TO THOMSON ELECTRIC WELDING COMPANY, OF BOSTON, MASSACHUSETTS, A CORPORATION OF MASSACHUSETTS.

PROCESS OF WELDING CAST IRON TO STEEL.

Application filed January 26, 1922. Serial No. 530,525.

*To all whom it may concern:*

Be it known that I, PRESTON M. HALL, a citizen of the United States, and a resident of Swampscott, in the county of Essex and State of Massachusetts, have invented certain new and useful Improvements in Processes of Welding Cast Iron to Steel, of which the following is a specification.

My invention relates to a method or process of electric welding and the article formed thereby and has to do more particularly with the process of uniting two pieces of dissimilar metal dissimilar in respect to their strength or brittleness, as for instance steel and cast iron.

The object of the invention is to produce a true welded joint or union in contradistinction from a merely fused union between the pieces and with a true weld having a total cross-sectional area in the weaker metal which is larger than the cross-section of the stronger metal back of the weld.

While my invention is particularly designed for welding dissimilar metals it may be applied to the welding of pieces of like metal.

The invention is particularly useful for producing headed rods in which the stem and head are made from different pieces welded together at the junction of the head and stem. This application of my invention finds its chief utility in the production of poppet valves for internal combustion engines wherein, as is usual in the art, the stem and the head or valve proper are composed one of steel and the other of cast iron. In the usual constructions of this type of device the practice has been to unite them by a joint produced by fusion in contradistinction to a true welded joint produced by heating the contacting parts and applying pressure.

The object of my invention is to produce a union which shall be less liable to breakage owing to the brittle nature of the metal composing the head than would be the case when the head and the stem are united by fusion or when the attempt is made to unite the end of the stem to the head by a weld of a cross-sectional area substantially the same as the cross-sectional area of the stem itself.

As applied generally to the welding together of metal pieces by heat and pressure my invention consists essentially in the process of uniting the end of a rod to a larger piece of metal by butting the end of the rod against the side or surface of said piece from which the rod projects in the finished work, heating the butted end and the part of the rod immediately back thereof by the passage of an electric current sufficiently to bring the same to a degree of plasticity sufficient for a welding and forging operation upon the heated metal, subjecting the rod to endwise pressure to cause the portion thereof back of the abutment to expand laterally and subjecting the rod while so heated to a welding pressure and at the same time shaping or forging the expanded metal and pressing it while in weldable condition against the larger piece to produce an enlarged union forming a true weld of greater size than the end of the rod itself.

The invention also consists in the new poppet valve having a steel stem and cast iron head resulting from said process.

The invention consists further in the novel construction of welding and forging die or holder whereby the process is facilitated.

1 is the rod such as a valve rod and 2 the head. The forging and welding die for holding the rod is preferably a split die or holder of metal the two parts of which are indicated at 3, 3'. Suitable means, not shown, for clamping the rod between the two parts are provided. The opposite electric current and pressure die or holder against which the piece 2 backs to receive current and pressure is indicated at 4. The rod is preferably received in a cylindrical passage in the holder 3, 3' formed by two semi-cylindrical grooves in the two meeting faces of the halves 3, 3' adapted to fit the rod. The line of split of the rod-holding die or forging tool is indicated at 5. In the end of the die or holder is a forging or shaping cavity indicated at 6 through the bottom of which the rod projects beyond the end of the die for engagement with the piece 2.

The surface of the head or piece 2 on the side nearest the rod is preferably provided with a protuberance or projection against which the end of the rod may be butted, said protuberance or projection being preferably, however, of slightly less circumference or width than the maximum width of the forging cavity.

Figure 1:
Fig. 1 shows a steel rod the ends of which may be left as cut off by the shears or cutter.
Figure 2:
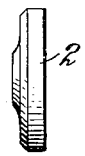
Fig. 2 shows a cast iron head of convenient size for welding and afterwards machining.
Figure 3:
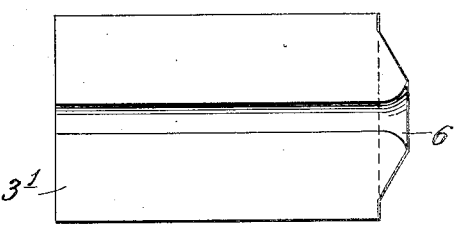
Fig. 3 is a plan of one half of a welding and forging tool or die in which the rod may be held for the application thereto of welding and forging action.
Figure 4:
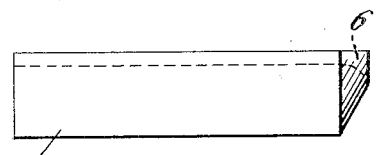
Fig. 4 is a side elevation of the same.
Figure 5:
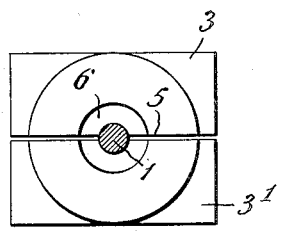
Fig. 5 is an end view of said die or holder.
Figure 6:
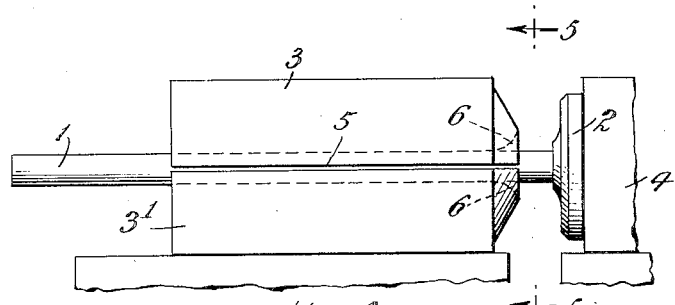
Fig. 6 shows the work assembled between the welding dies or holders for the welding and forging operation.

The welding of the rod to the head is produced by the heating of the work by the electrical resistance method while the rod is butted by its end against the nearer side of the piece or head 2 or side thereof adjacent the rod, and by the application of welding, forging and shaping pressure through the action of the tool or device 3, 3'. In this operation, the parts being arranged in the relation shown in Fig. 6, pressure is applied in the usual manner employed in apparatus for practicing welding by the electrical resistance method and a current is turned on and allowed to flow in an amount and under a pressure sufficient to heat the whole projecting end of the stem up to a proper welding and forging temperature by passing across the abutted parts and from one to the other of the dies engaging the two parts of the work. As soon as the proper welding and forging temperature is reached, the holder 3 or the die 4 or the platen supporting the same, either or both, move up toward one another, thus causing the projected portion of the rod under the pressure thus applied to expand or bulge laterally while at the same time the applied pressure causes the full diameter of the rod to be welded and, by the movement of the cup-shaped die, causes said die to forge and shape the laterally projected or expanded metal heated to proper welding and forging temperature and, in the operation of shaping and forming the same, to press it with a welding pressure against the portion of the piece 3 around the portion of surface initially engaged by the rod. The effect of this is the production of a welded joint between the same and the piece 3 such as is illustrated roughly in Figs. 8 and 9.

Figure 7:
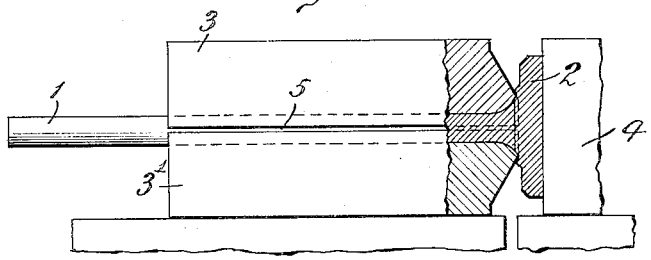
Fig. 7 shows the operation completed.

It will further be seen that by the use of the cavity in the forging and welding die, the metal that expands laterally is confined and the extent of its expansion limited to the area or surface of the part over which the weld is to be made. Also the effect is to forge the metal around the projection on the part 2 as well as against the surface surrounding the same when the projection and the cup in the die are proportioned as above described. The effect of forging a large volume of hot metal into the die and at the same time around the projection on the piece 2 is to prevent too rapid cooling which is the cause of the extreme brittleness of the weld made by the usual methods. As soon as, under the pressures and temperatures suitable for welding, the welding is finished, the current is cut off by means of an automatic switch or otherwise, the cut-off taking place just before or at the time or just after the parts reach the position shown in Fig. 7 which shows the completion of the operation.

Figure 8:
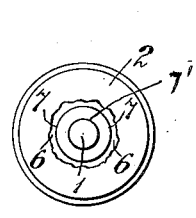
Fig. 8 is a top or end view of a valve made by the operation.
Figure 9:
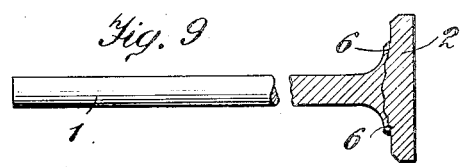
Fig. 9 is a central longitudinal section through the head and rod to illustrate the nature of the union.

In the finished union the area between the points 6, 6, Figs. 8 and 9, is all welded area, that outside of these points or lines being burrs or upset metal squeezed out of the forging head. Obviously the size of the forging or shaping cavity might be so adjusted to the length of rod projected and heated that there would be practically no extruded metal. The portion of the work included between the circular lines 7, 7, Fig. 8, will exhibit a finished appearance owing to the shaping action of the forging die and practically all the metal included between said lines on the face of the part 2 will be welded metal, thereby giving an area of weld much greater than would be afforded if the end only of the rod, the area of which is that included in the circular line 7', were welded.

The chief reasons why past attempts to weld cast iron and steel by any of the usual methods have been failures are:

1. Because in all cases only a weld as large as the area of the end of the steel has been attempted and even though this were accomplished that amount or area of cast iron does not have sufficient strength to withstand normal vibration or shock.

2. Because it has been impossible to obtain any degree of uniformity either as to strength or form.

3. Because by any of the usual methods of welding these materials a very hard and brittle weld results, which is surrounded by a large irregular burr which is also extremely hard and brittle.

By the use of my invention the following novel and advantageous features are secured:

1. Absolute uniformity of welds both as to strength and form.

2. A welded area which is approximately three times the area of the end of the steel is obtained, and as cast iron is approximately one-third as strong as steel, this makes a uniformly strong unit.

3. The line of weld obtained is not straight across the joint of the two materials but is wavy. This makes the joint stronger.

4. The effect of virtually forging a large volume of hot steel into the dies and at the same time around the projection on the cast iron is to prevent too rapid cooling which is the cause of the extreme brittleness of the welds made by the usual methods.

5. The forging of the stem results in an assembled valve which has only a very small amount of burr and surplus material to be removed by subsequent machining.

The particular construction of welding and forging die or holder herein described is the subject of a separate application for patent filed by me April 30, 1923, Ser. No. 635,465.

What I claim as my invention is:—

1. Composite metal work consisting of a headed rod the head and stem of which are united on the side of the head from which the rod projects by a heat and pressure weld formed in part of the forged metal of the end portion of the stem shaped and welded by pressure against the surface of the head to produce a weld having in the aggregate a cross-sectional area greater than the cross-sectional area of the stem back of the weld.

2. Composite metal work consisting of a headed rod the stem and head of which are respectively of different metals and are united at the end of the rod and on the side of the head from which the rod projects by a heat and pressure weld formed in part of the expanded forged metal of the end portion of the stem, and another part of the body of the stem surrounded by said forged metal, said weld having in the aggregate a cross-sectional welded area greater than the cross-sectional area of the stem back of the weld all of said welded area being a true weld in contradistinction to a fusion or union of melted metal.

3. As a new article of manufacture, a poppet valve having a cast iron valve head and a steel stem united on the side from which the stem projects by a heat and pressure weld of enlarged cross-section consisting in part of the initial contacting end of the stem and consisting in part of the forged expanded end portion of the rod engaging and welded against the surface of the valve head immediately around the initial contacting end, all of said weld being a true weld in contradistinction to a melted union.

4. A poppet valve having a steel stem and iron head, the end of said stem united to the valve head or disk by a heat and pressure weld of enlarged area containing the initial contacting end of the stem proper and surrounding laterally expanded material of the end portion of the stem welded against the surface of the head.

5. Metal work comprising two pieces of steel and iron respectively welded to one another by a heat and pressure weld on the surface of the iron, of larger cross-sectional area than that of the steel piece abutted against the same, said weld comprising the portions of the steel piece initially contacting with said surface and metal of said piece laterally expanded by the pressure and welded against the surface of the iron around the edge of the initial contact, all of said weld being a true weld in contradistinction to a melted union.

6. A poppet valve having its stem and head united by an electrical resistance weld of cross-sectional dimensions enlarged beyond the cross-sectional area of the stem so as to embrace portions of the surface of the head surrounding the stem, said weld comprising a portion of the metal of the stem initially contacting with the head on the surface thereof from which the same projects and upset laterally expanded metal of the stem forged and shaped by die pressure and welded against the surface of the head around the area of initial contact, all of said weld being a true weld of metal brought to welding temperature and subjected to pressure in contradistinction to a union of melted metal.

7. The herein described method of welding the end of a rod to a surface of another piece of larger area than the cross-sectional area of the rod itself, consisting in abutting the end of the rod against said surface subjecting the rod to endwise pressure, heating the rod at the point of contact and well back thereof to a welding and forging heat while said welding and forging temperature is maintained, welding the end portion of the rod itself to said piece and subjecting the heated portion of the rod expanded by said pressure laterally to a shaping and forging action within a hollow pressure die to shape and weld said portion against the surface of the opposite piece around the welded end portion of the rod, thereby forming a true heat and pressure weld on said piece of greater cross-sectional area than the cross-sectional area of the rod itself.

8. The herein described method of forming a weld between the end of a rod and a larger surface on that side of another piece from which the rod projects consisting in heating the end portion of the rod while in contact by its end with such larger surface by passing an electric current from one to the other until the rod is heated to welding and forging temperature and then subjecting the metal while such temperature is maintained in the contact end of the rod to a welding and forging pressure in a direction normal to said surface whereby the end of the rod and the expanded metal surrounding said end are welded to the surface of the opposite piece.

9. The herein described method of forming a weld between the end of a rod and a surface of larger area than said rod on the side of another piece of metal from which said rod projects, consisting in heating said rod to a welding and forging temperature and applying welding and forging pressure while maintaining said welding temperature to weld the contacting end of the rod and the forged metal surrounding the same to said surface.

10. The herein described method of forming a heat and pressure welded joint between the end of a rod and a surface of larger area on another piece, consisting in clamping the rod in a suitable holder forming a welding die with the end of the rod projecting through an opening in the bottom of a forging and molding or shaping recess in the face of said die and into contact with the surface of the opposite piece, heating the parts to forging and welding temperature by the passage of the current from one die to the other expanding the heated portion of the rod laterally by end pressure and while maintaining the forging and welding temperature, applying pressure to weld the end of the rod itself to the surface and to forge or shape the expanded metal and weld it to the portion of the surface surrounding the welded end of the rod.

11. The herein described process of welding two metal pieces of dissimilar material and dissimilar surface areas on their welding faces by a heat and pressure weld consisting in contacting the end of the smaller piece against the surface of larger area on the opposite piece while projected through an opening in a welding and forging die, heating the smaller piece to welding and forging temperature by passage of an electric current and applying pressure to forge and weld said projected portion of the smaller piece in a weld of larger cross-sectional area than the area of the original contacting surfaces.

12. The herein described method of welding the end of a metal rod to the surface of another piece, consisting in contacting the end of the rod against said surface in position projecting therefrom, heating the rod back of the contact to welding and forging temperature, applying pressure to expand the heated portion of the rod laterally and at the same time confining the laterally expanded portion and welding it against the surface of the opposite piece surrounding the surface of contact first engaged by the rod.

13. The herein described method of welding a rod by its end to another piece of metal, by abutting the end of a rod against the surface of said piece from which the rod projects, heating the abutted end of the rod and the part immediately back of the same to a welding and forging temperature, applying pressure to expand the rod laterally and, while confining the lateral expansion, welding said heated and expanded part to the surface of said opposite piece immediately surrounding the portion of surface with which the rod makes initial contact.

14. The herein described method of welding the end of a rod to another piece of metal, by engaging the end of the rod with a surface of said piece on the side thereof from which the rod projects, heating the rod to welding and forging temperature, enlarging the portion of the rod back of the initial contacting portion by an upsetting pressure and welding the upset portion to the opposite piece by the pressure of a forging and shaping die applied to said upset portion.

15. The herein described method of welding the end of a rod to another piece of metal having a welding surface of larger area than the end of said rod, consisting in contacting the end of the rod with said surface on the portion thereof to which said end is to be welded, heating the contacting end of the rod and portion immediately back of the same to welding and forging temperature and applying pressure while the heated metal back of the contacting end is maintained at a welding and forging temperature and is confined in a depression in the surface of a welding die to weld it to the opposite piece.

16. The herein described method of welding a rod to another piece of metal, consisting in clamping the rod in the die with its end protruding through a cavity in the face thereof into contact with the opposite piece, heating the rod to welding and forging temperature by passing an electric current and applying pressure to upset the metal of the heated protruding end and, while confining it in a cavity in the face of the welding die, effecting the weld by the pressure.

17. The herein described method of forming a heat and pressure welded joint between the end of a rod and another piece of metal by a butt-welding process consisting in bringing the butted end of the rod and a portion back thereof to a proper welding temperature and while maintaining that temperature, applying pressure and welding the end of the rod and the upset metal of the rod back of and around said end to the opposite piece while confining said upset metal.

Signed at Lynn, in the county of Essex and State of Massachusetts, this 12th day of January, A. D. 1922.

PRESTON M. HALL.

Witnesses:
 WOLCOTT REMINGTON,
 RICHARD J. BLACK.